July 20, 1937.   C. V. CLARK   2,087,638
HYDRAULIC BRAKE
Filed June 15, 1936
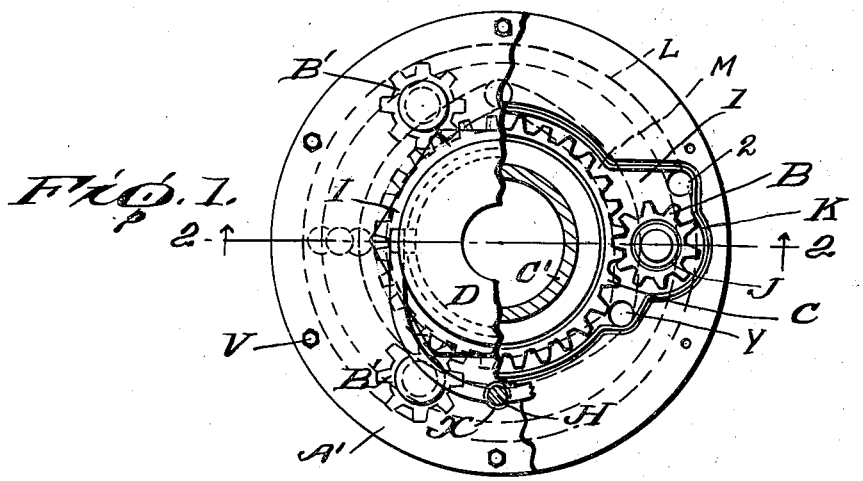
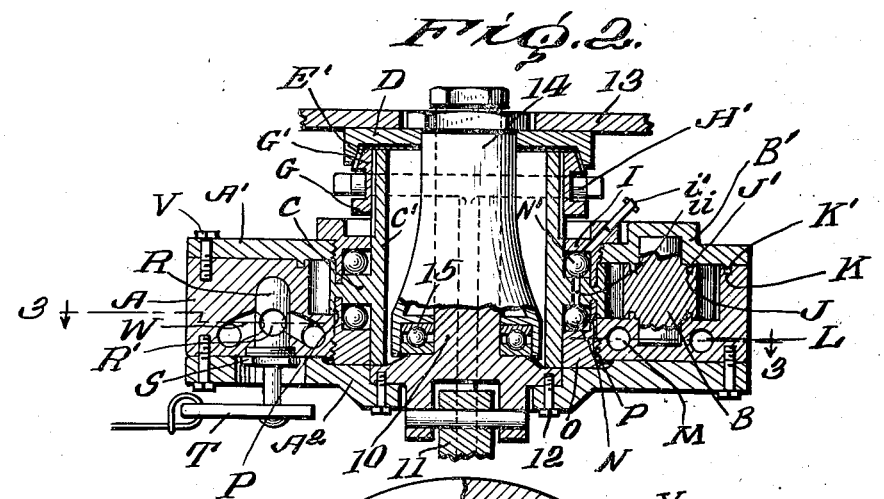
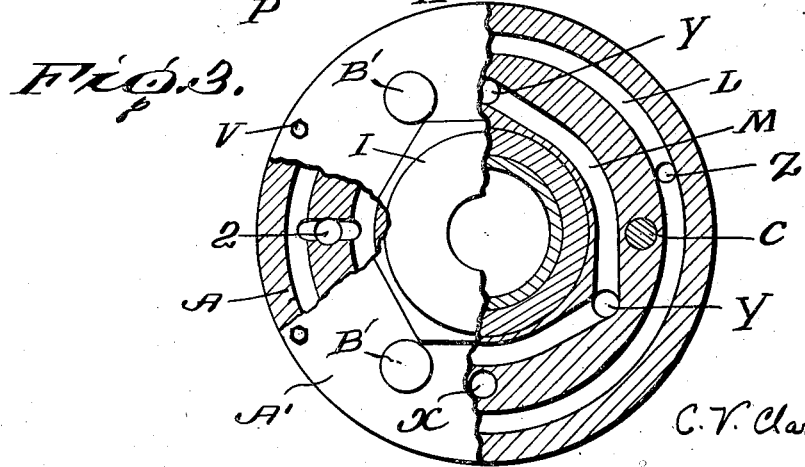
Inventor
C. V. Clark
By Patterson, Wright & Patterson
Attorneys

UNITED STATES PATENT OFFICE 2,087,638

HYDRAULIC BRAKE

Clarence Vergil Clark, Hays, Kans.

Application June 15, 1936, Serial No. 85,360

5 Claims. (Cl. 188—92)

This invention relates to certain new and useful improvements in hydraulic brakes, the object being to provide a hydraulic brake which is exceedingly simple and cheap in construction, the same being composed of very few parts so assembled as to reduce friction to a minimum, means being provided for restricting the passage of the fluid from one channel to the other by a manually operated valve whereby a hydraulic brake is provided which will withstand the strain to which it is subjected.

Another object of my invention is to provide a hydraulic brake which is so constructed that it can be used for braking the wheels of motor vehicles so as to so position the brakes in respect to the spindles of the axles that the steering of the automobile will not be interfered with.

Another object of my invention is to provide a brake in which a centrally disposed power pump gear is utilized which is in mesh with a plurality of idle pump gears mounted in pumping chambers so as to obtain a direct drive between the power pump gear and the idle pump gear.

Other and further objects and advantages of the invention will be hereinafter set forth and the novel features thereof defined by the appended claims.

In the drawing,

Figure 1 is a top plan view with a part of the cover of the section removed;

Figure 2 is a section taken on line 2—2 of Figure 1, a portion of the casing being broken away;

Figure 3 is a top plan view, partly in section, showing the fluid channels, the section being taken on the line 3—3 of Fig. 2.

In carrying out my invention I employ a circular ring-shaped sectional casing formed of sections A, A' and A² connected together by stud bolts, the section A being provided with a sealing groove K into which extends a flange K' formed on the section A'.

The section A is provided with pump chambers I herein shown three in number in which are revolubly mounted idle pump gears B provided with annular sealing grooves J into which extend annular flanges J' formed respectively on the sections A, A' to prevent seepage of the fluid past the idle pump gears in order to maintain the pressure. The pump gears B are journaled in the bosses B'.

The idle pump gears B are in mesh with and are driven by a power pump gear C mounted on suitable bearings N, N' held in position within the casing by bearing retainers I and O. Suitable lubricating means $i'$ are provided for injecting a lubricant to the bearing and the power pump gear C is provided with suitable passages $ii$ to allow the lubricant to pass from one bearing to the other in order to thoroughly lubricate the same. The power pump gear C is preferably provided with an annular sealing groove P as clearly shown in Figure 2.

The power pump gear C is provided with a hub portion C' which extends outwardly at one end beyond the casing and has feathered thereon a clutch member G provided with tapering teeth G' cooperating with the tapering internal clutch teeth E' formed on the rotating member D to be braked.

The sectional casing is provided with a transverse bearing openings X in which is slidably mounted a clutch operating member H provided with a clutch yoke H' engaging the sliding clutch member G for connecting and disconnecting the power gear pump C to the rotating member D.

The section A of the casing is provided with spaced annular fluid channels L and M connected to the respective pump cylinders by fluid ducts Y and Z through which the fluid is circulated when the power pump gear is rotated. The fluid passes from the outer fluid channel to the inner fluid channel when rotated in one direction and from the inner fluid channel to the outer fluid channel when rotated in the reverse direction.

The fluid channels L and M are connected to a valve chamber 2 by fluid passages W as shown in Figure 2. Mounted within the valve chamber is a plug valve R provided with a port R' and secured therein by a valve retainer S, the valve being provided with an operating lever T for turning the same for varying the restriction between the fluid channels L and M to increase or decrease the braking of the rotating member.

The channels and pump chamber are filled with a suitable fluid when the valve is removed and can be refilled at any time by simply removing the valve.

The construction of the brake is such that the parts are thoroughly lubricated at all times so as to reduce friction and by having the power pump gear in mesh with the idle pump gears, I am able to form a pump with a very few parts so as to form a positive drive between the power pump gear and the idle gears whereby the fluid will be circulated through the channels and controlled by the restriction.

In the drawing the device is shown as applied to a wheel of a motor vehicle or the like and from Figure 2 it will be seen that 10 designates a spindle for the axle 11. To this spindle is attached as at 12 the casing part A². The wheel is designated at 13 and is suitably secured to the member D so that they rotate together about the spindle 10 on the elongated collar 14 having roller bearings 15.

Preferably the fluid control valve R and the clutch are operated on all of the vehicle wheels at the same time and therefore the clutch operating member H and the valve lever T will lead to a common master operator (not shown) which would be conveniently located to the vehicle driver. The connection to the master operator preferably should be such that the clutch becomes engaged slightly before the valve R starts to close and does not become disengaged until after the valve R is opened. This will permit the clutch to move freely.

From the foregoing it will be understood that in operation the wheel 13 and the disc member D rotate whenever the vehicle is moving. To slow down or stop the vehicle, that is, to "brake" the vehicle, the master operator is actuated which will move the clutch into engagement and partly close the valve R. Engagement of the clutch with the disc D causes the main gear pump C to rotate which in turn rotates the idler pump gears B. The pump gears pump liquid from the pump chambers and cause it to circulate from the outer fluid channel L into the inner fluid channel M through the ducts Y and Z and back into the outer channel through the valve R and the passages W. The degree to which the valve R is closed determines the back pressure exerted upon the fluid and the degree of braking exerted upon the movement of the vehicle.

What I claim is:

1. In a hydraulic braking device of the kind described, the combination with a rotating member, of a power pump gear adapted to be rotated thereby, a stationary casing in which said power pump gear is mounted to rotate, a pump chamber in said casing, an idler pump gear mounted in said pump chamber and in mesh with said power pump gear, said casing being provided with spaced fluid channels removed from said pump chamber and in communication with said pump chamber and through which fluid is directly circulated from one channel to the other when said idler pump gear is rotated, means for selectively connecting and disconnecting said idler pump gear to said rotating member, and a valve controlled fluid passage connecting both fluid channelways for restricting the flow of fluid from one channel to the other.

2. In a hydraulic braking device of the kind described, the combination with a rotating member to be braked, of a power pump gear adapted to be rotated by said rotating member, a clutch member for selectively providing driving connection between said rotating member and said power pump gear, a stationary casing in which said power pump gear is mounted to rotate, a plurality of pump chambers in said casing, an idler pump gear mounted in each of said chambers and in mesh with said power pump gear, spaced fluid channels in said casing and in communication with said pump chambers, and a valve controlled fluid passage connecting said fluid channels for restricting the flow of fluid from one channel to the other, for the purpose described.

3. In a hydraulic braking device of the kind described, the combination with a rotating member, of a power pump gear rotatably mounted within said casing and having an extending hub, a plurality of pump chambers within said casing, an idler gear rotatably mounted in each of said pump chambers and meshing with said power pump gear, a movable clutch member having driving connection with the hub of said power pump gear and adapted to be moved into driving connection with said rotating member, endless fluid channels in said casing and in communication with said pump chambers and through which fluid is circulated when the power pump gear is rotated, and a valve controlled fluid passage connecting said fluid channels for restricting the flow of fluid from one channel to the other, for the purpose described.

4. A hydraulic braking device comprising a casing, a power pump gear rotatably mounted therein, endless and spaced fluid passageways in said casing and encircling said pump gear, a pump chamber and an idler pump gear mounted therein and meshing with said power pump gear, passageways connecting each of said fluid channels with said pump chamber, a fluid passageway interconnecting said fluid channels, valve means for restricting the flow of fluid from one channel to the other, a rotatable member to be braked, and clutch means adapted to provide driving connection between said rotatable member and said power pump gear, the parts operating as and for the purpose described.

5. In a hydraulic braking device a support and a member rotatable thereon to be braked, a casing carried by said support and having therein a plurality of endless fluid channels, a power pump gear in said casing, a plurality of pump chambers in said casing and arranged around said power pump gear, an idler pump gear in each of said pump chambers and meshing with said power pump gear, communication between each of said fluid channelways and said pump chambers, a communicating passageway between said fluid channelways, a valve in said last named passageway for restricting the flow of fluid from one channel to the other, and clutch means operable to place the power pump gear in driving connection with the rotatable member, the parts operating as and for the purpose described.

CLARENCE VERGIL CLARK.